United States Patent [19]

Billingsley

[11] Patent Number: 4,530,010
[45] Date of Patent: Jul. 16, 1985

[54] DYNAMIC INFRARED SCENE PROJECTOR

[75] Inventor: James D. Billingsley, Arlington, Tex.

[73] Assignee: LTV Aerospace and Defense Company, Dallas, Tex.

[21] Appl. No.: 431,710

[22] Filed: Sep. 30, 1982

[51] Int. Cl.³ .............................................. H04N 1/04
[52] U.S. Cl. .................................................. 358/231
[58] Field of Search ...................... 358/231, 236, 113; 353/63

[56] References Cited

U.S. PATENT DOCUMENTS

| | | | |
|---|---|---|---|
| 3,134,297 | 5/1964 | Carlson | 358/236 |
| 3,409,376 | 11/1968 | French et al. | 356/110 |
| 3,438,022 | 4/1969 | Teeg et al. | 340/324 |
| 3,551,051 | 12/1970 | Salgo | 356/51 |
| 3,571,493 | 3/1971 | Baker | 358/231 |
| 3,576,364 | 4/1971 | Zanoni | 353/28 |
| 3,655,256 | 4/1972 | Claytor et al. | 350/3.5 |
| 3,764,192 | 10/1973 | Wheeler | 350/7 |
| 3,778,785 | 12/1973 | Gutfeld | 340/173 LS |
| 3,789,420 | 1/1974 | Claytor et al. | 346/1 |
| 3,829,192 | 8/1974 | Wheeler | 350/7 |
| 3,831,165 | 8/1974 | Chivian et al. | 340/324 R |
| 4,040,047 | 8/1977 | Hareng et al. | 340/324 R |
| 4,236,156 | 11/1980 | Eden | 340/786 |
| 4,245,217 | 1/1981 | Steinhage | 340/555 |
| 4,283,113 | 8/1981 | Eden | 350/96.15 |

Primary Examiner—Tommy P. Chin
Attorney, Agent, or Firm—Stephen S. Sadacca; James M. Cate

[57] ABSTRACT

A dynamic infrared scene projector for presenting cinematic, two-dimensional, spatially distributed scene data to an infrared sensor is provided comprising programmable, thermoptic infrared modulators which exploit thermally-induced changes in the infrared optical properties of a thin film of vanadium dioxide. Because of a hysteresis in the vanadium dioxide material, a stored scene can be created in the modulators by scanning a focused modulated visible or near-infrared laser beam across the thin film while it is thermally biased in the hysteresis loop. The scene is projected into the sensor by placing the modulators between an infrared source/condenser system and a system of projection optics. Dynamic scene projection is accomplished by an erase/rebias system and an optical framing switch to yield a flicker-free output. Erasing of the optical modulator is accomplished by momentarily cooling the $VO_2$ film to a temperature below the hysteretic loop. Rebiasing of the optical modulators is accomplished by reheating to increase the temperature of the thin film to a value not exceeding a thermal bias temperature.

26 Claims, 7 Drawing Figures

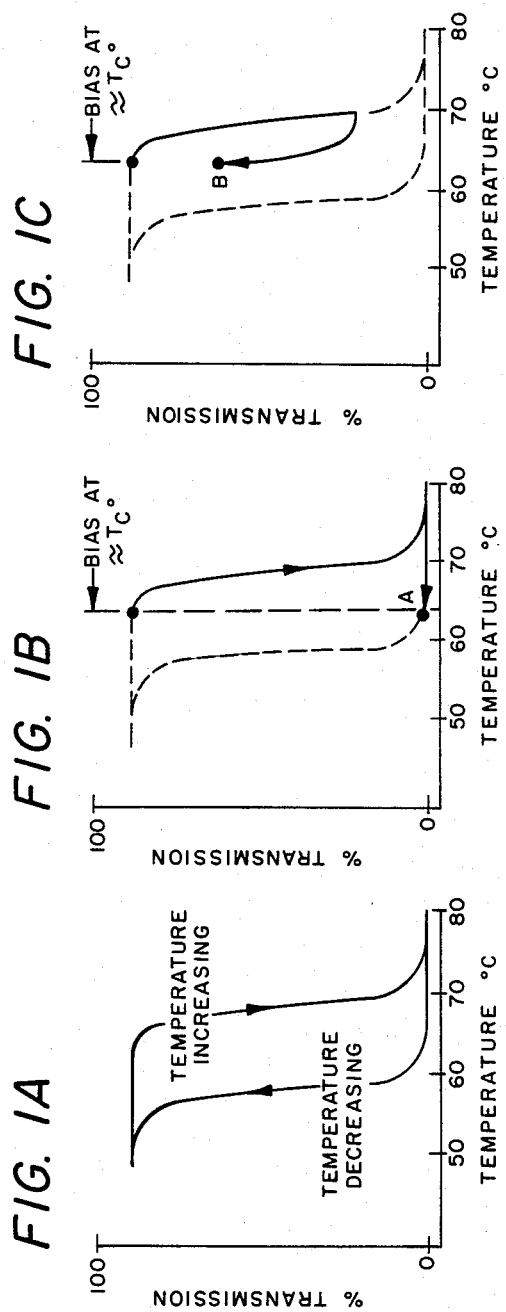

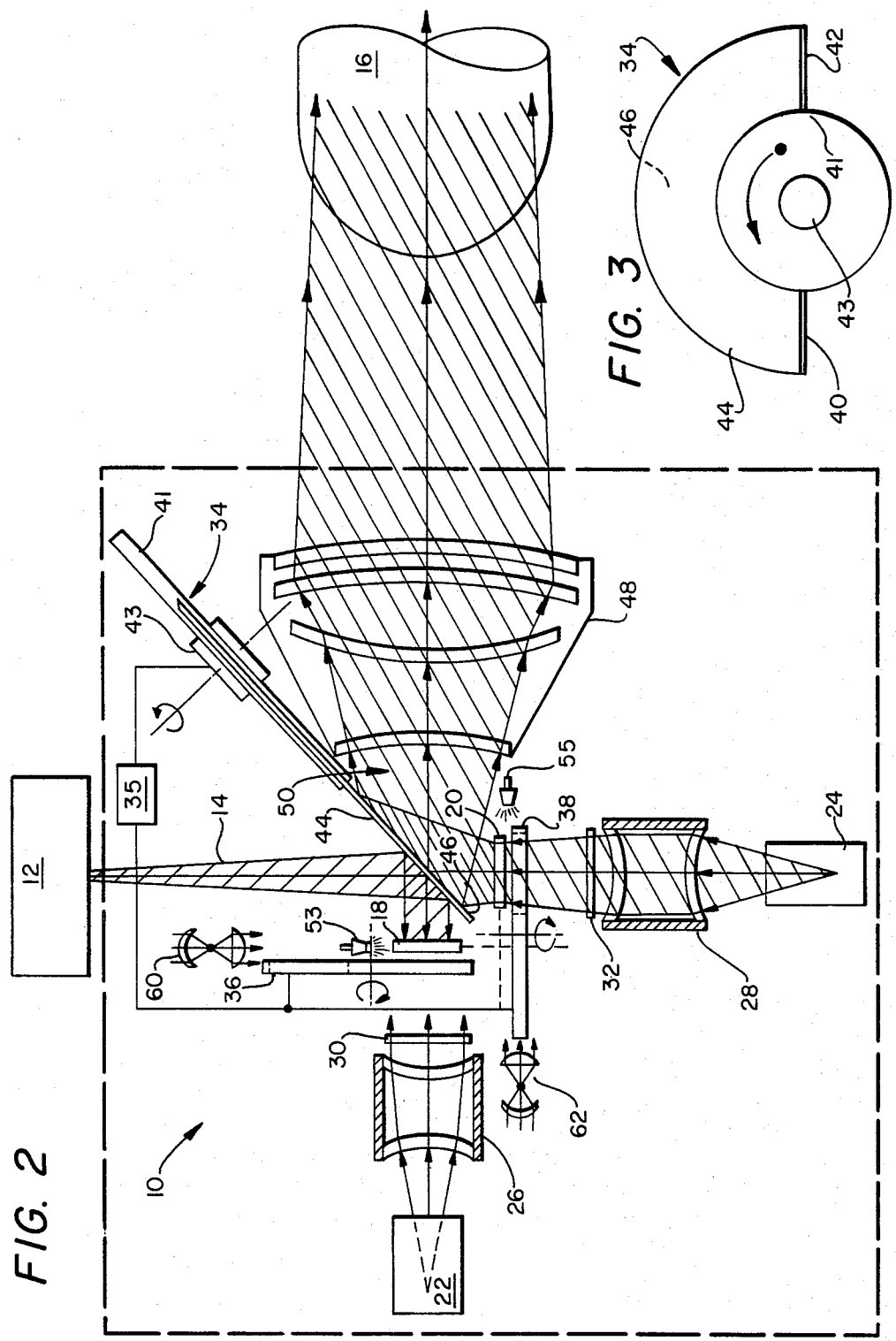

DYNAMIC INFRARED SCENE PROJECTOR

TECHNICAL FIELD

The present invention relates to a dynamic infrared scene projector for presenting cinematic, two-dimensional spatially distributed infrared scene data to an infrared sensor.

BACKGROUND OF THE INVENTION

Thermoptic materials exhibit changes in physical properties such as electrical conductivity, absorption, reflectance and refractive index as a result of thermodynamic state changes between the semiconductor and metal state. Thermoptic materials, such as certain oxides of vanadium and titanium have relatively high transmittance in the semiconductor state and high reflectance in the metal state over an extended region of the electromagnetic spectrum.

The changes in physical properties that are associated with the thermodynamic state change are large and occur over a small range of temperature; i.e., there is some transition temperature below which the material is a semiconductor and above which it is a metal. In the immediate region of this transition temperature, the optical properties, such as transmittance or reflectance are very temperature sensitive. Moreover, these physical properties exhibit a hysteretic behavior around the transition temperature, especially when the material is in thin film form. That is, the transition temperature is higher when increasing temperature from a lower value than the transition temperature which occurs upon cooling from a higher temperature.

It is now well-known that images can be recorded in films of thermoptic materials at extremely high speeds by heating a region of the film with a laser or electron beam. As long as the ambient temperature of the film is maintained at a suitable recording temperature inside the recognized hysteresis loop, these images will be stored in the film. Normally, such images are erased by allowing the entire film to cool from its recording temperature to some temperature below the loop.

When an image has been recorded (stored) in a film of thermoptic material, that film can be used as an efficient, two-dimensional spatial modulator of infrared radiation. By the use of two such thermoptic films as modulators in a system of infrared projection optics that allows alternate modulators to project successive frames of dynamic infrared imagery, it is possible to have a cinematic infrared scene projection system. The image storage property of the thermoptic films makes it possible for the projected dynamic scene data to be flicker-free, a feature which is important to but not heretofore available in the testing of infrared systems.

SUMMARY OF THE INVENTION

The present invention provides a flicker-free cinematic infrared scene projector for physical simulation capability of realistic spatial infrared data scenes. In particular, infrared spatial data is projected into an infrared sensor.

The infrared scene projector of the instant invention employs thermoptic programmable, two-dimensional infrared optical modulators that exhibit hysteretic behavior in an optical property as a function of a stimulus. In a preferred embodiment of the invention, these modulators comprise a thin film of vanadium dioxide ($VO_2$) that exhibits substantial changes in infrared transmittance and reflectance as a function of temperature. Because of the hysteretic properties of the vanadium dioxide, a stored scene can be created in a modulator by scanning a visible laser beam, modulated by a source of scene data, in a two-dimensional pattern across the $VO_2$ thin film while the film is thermally biased in its hysteresis loop. The scene is projected onto a sensor by placing the modulators between an infrared source/condenser system and a system of projection optics. To change the scene, the modulator is cooled below the hysteretic loop and reheated to a bias temperature. New scene data is then written into the modulator by the laser. Dynamic scene projection is accomplished by means of an erase/rebias system and an optical framing switch to alternate between modulators to yield a flicker-free output.

The thin film $VO_2$ optical modulators of the instant invention exhibit substantial changes in infrared transmittance and reflectance as a function of temperature in the region of their phase transition temperature. Below this temperature, the film has the properties of a semiconductor; above this temperature, the properties of a metal. The phase transition exhibits a hysteretic behavior, therefore as the temperature of the thin film increases from well below the phase transition temperature, the phase transition occurs at a higher temperature than it does as temperature is decreased from well above the phase transition temperature. If the $VO_2$ film is thermally biased at a temperature within its hysteresis loop and heat is injected momentarily into the film so as to locally increase the temperature above the loop, when the local region relaxes to thermal equilibrium with the surrounding film, a "stored" spot of high contrast in transmittance or reflectance occurs. This spot of contrasting transmittance or reflectance will remain stored as long as the thermal bias is maintained. The erasure of the stored information is accomplished by momentarily reducing the temperature of the $VO_2$ film below the hysteresis loop and then reheating to the bias temperature.

According to the present invention, infrared scene data is written frame-by-frame on the optical modulators by a scanned and modulator laser beam focused thereon. The laser beam is modulated by a source of scene data, and is scanned in a two-dimensional pattern on the surface of the infrared optical modulators. By controlling the intensity of the laser beam in synchronization with the scan pattern, a two-dimensional scene or pattern is written on the $VO_2$ film.

To accomplish this frame-by-frame writing, and the subsequent projection of successive frames on the sensor to provide a flicker-free, dynamic infrared scene, an optical framing switch is provided. In particular, the first and second optical modulators have their surfaces oriented in planes that are perpendicular. The optical framing switch is oriented at a 45° angle to both these planes to control the writing and projection of the infrared scene data. The optical framing switch comprises a semicircular framing mirror that rotates in and out of the cone of the infrared light produced by the first and second modulators. The mirror's rotational speed in revolutions per second is one-half the desired framing rate in frames per second. While the mirror is in a first position, a frame of infrared scene data on one of the optical modulators is erased and a new frame is written on that optical modulator. Simultaneously, a frame that has been previously written on the other modulator is projected onto the sensor. After a new frame of scene data is recorded on the first modulator, the framing mirror moves to a second position fading in the new scene frame and fading out the previous scene frame from the other optical modulator. A knife edge on the framing mirror causes the radiant flux from each resolution element in the old frame to be reduced at the same rate that the flux from each corresponding element in the new frame is increased so that there is no fluctuation or flicker in the flux perceived by the sensor except that due to changes in the scene data. Upon reaching the second position, the frame on the second modulator is projected into the sensor and the first modulator undergoes an erase and rewrite cycle. This sequence of projection from alternate spatial modulators continues throughout operation of the projector to produce an essentially flicker-free image presented to the sensor.

In order to write new frames on the optical modulators, the previous scene is erased and then the $VO_2$ film is rebiased to approximately the phase transition temperature. This erase-rebias cycle is accomplished by erase/rebias heads which are juxtaposed in close proximity to each modulator.

BRIEF DESCRIPTION OF THE DRAWINGS

FIGS. 1A, 1B and 1C show the hysteresis in phase transition of a thermoptic $VO_2$ thin film optical modulator.

FIG. 2 shows a top view of the dynamic infrared scene projector of the present invention for presenting cinematic two-dimensional spatially distributed scene data.

FIG. 3 shows a back view of the optical framing switch of FIG. 2.

DETAILED DESCRIPTION

Figure 4:
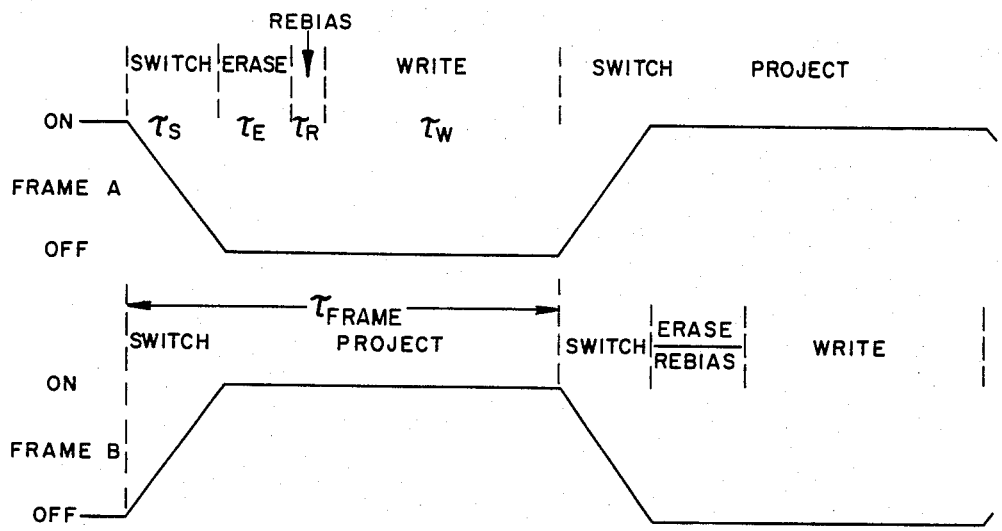
FIG. 4 is a timing diagram disclosing the erase-rebias-rewrite cycle for the optical modulators.

Referring now to FIGS. 1A, 1B, and 1C, the hysteretic property of the optical modulators is shown in a graphical representation. In accordance with the present invention, the spatial optical modulators exhibit a hysteretic behavior in an optical property, such as transmittance or reflectance, as a function of some stimulus, such as pressure, thermal, or electrical energy. In a preferred embodiment of the invention, each optical modulator is a thin film of vanadium dioxide ($VO_2$) that exhibits substantial changes in infrared transmittance and reflectance as a function of temperature in the region of its phase transition temperature $T°_c$, nominally 65° Celsius. Below $T°_c$, the film has the properties of a semiconductor; above $T°_c$ the properties of a metal. With reference to FIG. 1A, it can be seen that the phase transition of the thin film exhibits a hysteretic behavior; i.e., as its temperature increases from well below $T°_c$, the phase transition occurs at a higher temperature than it does as temperature is decreased from well above $T°_c$. If the $VO_2$ film is thermally biased at approximately $T°_c$ and heat is injected momentarily into the film so as to locally increase the temperature above the hysteresis loop, then a spot of high contrast in transmittance or reflectance will occur when the local region relaxes to thermal equilibrium, as represented by point A in FIG. 1B. However, if the temperature is increased only partially through the hysteresis loop, an intermediate level of contrast occurs in the spot, as represented by point B in FIG. 1C. The stored spots of contrasting transmittance or reflectance constitute optically stored information that remain stored as long as the thermal bias is maintained. To erase the information, the temperature of the entire $VO_2$ film is momentarily reduced below the hysteresis loop. The $VO_2$ film is then rebiased in preparation for writing and storing a new set of optical data or information.

As noted above, in the preferred embodiment of the invention a thin film of vanadium dioxide is used to form the optical modulator. This structure, however, is not meant to be limiting, as any material capable of (a) storing scene data for a suitable time duration, (b) spatially modulating infrared light and (c) being erasable and reusable with new scene data in a suitable short time duration, would be considered within the scope of the present invention. For example, other materials that have been shown to have this capability to some degree are vanadium sesquioxide ($V_2O_3$), liquid crystals and thermoplastic films.

Referring now to FIG. 2, the dynamic infrared scene projector 10 of the present invention is shown in detail. The scene data emanates from a laser write subsystem 12 which controls a laser beam 14. This scene data is written on one of the $VO_2$ films 18 or 20 by the scanned and modulated laser beam 14. The stored scene data is subsequently projected into a sensor 16 by the infrared scene projector 10 to simulate real-time scene dynamics for testing the sensor performance under various scenario conditions. In practice, a particular scenario can be replayed as many times as necessary to completely test the system.

The wavelength of the laser beam 14 is preferably in the visible or near-infrared region; i.e., approximately 450 to 1100 nanometers, since the absorptance of the $VO_2$ film is high in this region. Given this high absorptance, only a relatively low power laser beam is required, therefore leading to higher efficiency of energy transfer. It should be appreciated that other methods of writing the scene data onto the modulators may also be provided. In particular, an electron beam or a heated mechanical stylus may be utilized. If an electron beam is used to write the scene data, the $VO_2$ film is incorporated into the faceplate of a CRT.

With reference now to FIG. 2, the projector 10 includes first and second optical modulators 18 and 20 oriented with their surfaces perpendicular to one another in conjugate focal planes of projection optics 48 by the presence or absence of a framing mirror 34. Each of the modulators is illuminated uniformly on one side by precision blackbody sources 22 and 24, in conjunction with condenser lenses 26 and 28, and band pass filters 30 and 32. The band pass filters 30 and 32 define the infrared band to be projected, while the condenser lenses 26 and 28 provide for uniform backlighting of the optical modulators with the radiant energy output of the blackbody sources 22 and 24. Infrared light from blackbody source 22 is spatially redistributed by condenser lens 26 and filtered by band pass filter 30. This light is transmitted to the sensor 16 through the first optical modulator 18. Similarly, the infrared light from blackbody source 24 is spatially redistributed by condenser lens 28 and filtered by band pass filter 32. This light is transmitted to the sensor 16 through the second optical modulator 20. The purpose of the spatial redistribution by the condenser lenses 26 and 28 of the light from sources 22 and 24 is to result in a uniform backlighting of the optical modulators 18 and 20 as viewed by the sensor 16. One method of doing this is to design the condenser lenses to reimage the aperture of the blackbody sources on the exit pupil of the projection optics 48.

The optical modulators 18 and 20 spatially modulate the incident infrared light from blackbody sources 22 and 24, respectively, in accordance with the scene data written thereon by the laser beam 14.

In the preferred form of the present invention, scene data is written frame-by-frame on the surfaces of the first and second optical modulators by scanning the laser beam 14 in a two-dimensional scan pattern. In particular, a first frame of scene data is written into the first optical modulator 18 by controlling the intensity of the laser beam 14 in synchronization with the scan. The intensity of the laser at each point in the scan depends on the scene data, and thus varying spots of contrast are produced across the modulator to form the stored frame. Subsequently, a second frame of scene data is written into the second optical modulator 20 in a similar fashion.

To control the sequencing of the scene data frames, an optical framing switch 34 and erase/rebias heads 36 and 38, are provided. The optical framing switch 34 is oriented at a 45° angle to the planes of the two optical modulators, while the erase/rebias heads are juxtaposed in close proximity to the first and second optical modulators 18 and 20. Specifically, erase/rebias head 36 is used to erase and rebias the optical modulator 18, while the erase/rebias head 38 is used to erase and rebias the optical modulator 20.

Referring briefly now to FIG. 3, the optical framing switch 34 is seen in detail. This switch comprises a semicircular annulus with a leading knife edge 40 and a trailing knife edge 42. The annulus is mounted on a support hub 41 that rotates on shaft 43. The front surface of the annulus (the surface on the same side as the projector optics) is provided with a mirrored surface 46 to reflect incident infrared light. The back surface of the annulus is provided with a mirrored surface 44 to reflect visible or near-infrared light at the wavelength of the laser beam 14. The sharp edge of this knife edge is on the same side as mirrored surface 44.

Returning to FIG. 2, the operation of the dynamic infrared scene projector 10 can now be described in detail. With the framing mirror in the position shown in FIG. 2, the erase/rebias head 36 accomplishes an erase and thermal rebias function on optical modulator 18. A new frame of data is then written on optical modulator 18 by the laser beam 14 which is reflected off the mirror 44 on the back side of the optical framing switch 34. As the optical modulator 18 is undergoing this erase-rebias-rewrite cycle, a frame that has been previously written on the modulator 20 is reflected off the mirrored surface 46 on the front side of the optical framing switch 34. This frame of scene data is projected into the sensor 16 through the projection optics 48.

After a new frame of scene data is recorded on modulator 18, the trailing knife edge 42 of the optical framing switch 34 crosses through the cone of light 50 collected by the projection optics 48, fading in the new scene frame from optical modulator 18 and fading out the previous scene frame from optical modulator 20. The passage of the knife edge causes the radiant flux from each resolution element in the old frame to be reduced at the same rate that the flux from each corresponding element in the new frame is increased such that there is essentially no flicker in the flux perceived by the sensor.

After the trailing knife edge 42 passes through the projection optics collection cone of light 50, the newly written frame on optical modulator 18 is projected into the sensor 16 and modulator 20 undergoes the erase-rebias-rewrite cycle with the next frame of the infrared scene data. After this scene is written onto modulator 20, the leading knife edge 40 of the optical framing switch 34 crosses through the collection cone 50, fading out the scene from the optical modulator 18 and fading in the new scene from optical modulator 20. This sequence of frame-by-frame projection of scene data from alternate optical modulators 18 and 20 continues throughout operation of the projector, thereby producing an essentially flicker-free image presented to the sensor. The synchronization of the erase/rebias cycle and the optical framing switch 34 is provided by an electronic timing circuit 35.

FIG. 4 shows a timing diagram for the operation of the infrared scene projector of FIG. 2. As seen in this diagram, one of the optical modulators goes through an erase-rebias-rewrite cycle as the other optical modulator is projecting the previously written frame of scene data to the sensor 16. As can be seen from the diagram, the time available to write a new scene frame, $\tau_W$, is less than one full frame, $\tau_{frame}$. More specifically, $\tau_{frame}$ can be expressed as follows:

$$\tau_{frame} = \tau_S + \tau_E + \tau_R + \tau_W,$$

where
 $\tau_S$ = switching cycle
 $\tau_E$ = erase cycle
 $\tau_R$ = rebias cycle
 $\tau_W$ = write cycle Since real time cinematic data is provided to the infrared projector, the laser subsystem 12 includes a buffer memory and data time compression circuitry. These elements are well-known in data compression systems and form no part of the instant invention. The buffer memory takes a frame of scene data and reads out the frame in the allowable time for the write function. This data compression can be controlled by a microprocessor, or the like. The data frame compression ratio will depend on the time budgeted for switching between modulators, erase and rebias.

In order to simulate the high rate dynamics of realistic scenarios, framing rates on the order of 20 to 100 hz are utilized. Rotational speed in revolutions per second of the optical framing switch 34 is one-half the desired framing rate in frames per second, i.e., approximately 10 to 50 rev./sec. From the timing diagram of FIG. 4, it can be seen that the time required for the erase and rebias functions, $\tau_E$ and $\tau_h$, respectively, is a small fraction of the total frame, $\tau_{frame}$. The erase and thermal rebias functions are accomplished in as short a time as possible to allow the larger fraction of the frame period for the write function, since the required laser power and modulation bandwidth are inversely proportional to the frame write time.

As noted in the discussion of FIG. 1, erasure of the stored information in the optical modulators is accomplished by momentarily reducing the temperature of the entire $VO_2$ film below its hysteresis loop and then reheating to approximately the bias temperature. One method of accomplishing this erase-rebias cycle is by means of the erase-rebias heads 36 and 38 of FIG. 2, whereby cold and hot surfaces are successively moved rapidly past the modulator surface in very close proximity to it. Cooling and heating result from conductive and convective heat transfer through the gas in the small gap between the head and the modulator surface. The rate of cooling and heating can be increased by the injection of cold or hot gas through ports in the erase-rebias heads resulting in increased turbulence and enhanced heat transfer across the gap between the head and the modulator surface. Further improvement in the rate of cooling can be achieved by injecting a cold liquid, such as a liquified gas, through the ports in the erase head into the gap between the head and the modulator surface.

It should be appreciated that any method of rapidly cooling and reheating the modulator surface to accomplish the erase and rebias functions can be utilized advantageously. The methods described above are not meant to be limiting. For example, a preferred method of cooling the modulator surface is by means of evaporation of a liquified gas uniformly distributed over the surface by discharge through nozzles 53 and 55 shown in FIG. 2. Thereafter, rebiasing may be accomplished by flooding the surface of the modulator with a turbulent hot gas or other means of injecting heat into the thermoptic film. If nozzles 53 and 55 are used to cool the film, erase-rebias heads 36 and 38 are not used.

As noted above with respect to FIG. 4, it is desired to minimize the erase cycle $\tau_R$ such that the majority of the frame period $\tau_{frame}$ can be utilized to write the scene data. Given a desired framing rate of between 20 and 100 hz., $\tau_E$ must be on the order of a few milliseconds or less. The above techniques for cooling the VO$_2$ thin film obtain such values for erasure where the thickness of the film is in the range of 0.2 to 0.8 micrometers. However, several of the rebiasing techniques, although effective, are either not fast enough where high frame rates are used, or not cost or energy efficient. Therefore, in accordance with an alternate embodiment of the present invention, a method of rapid heating for rebias is disclosed.

Figure 5:
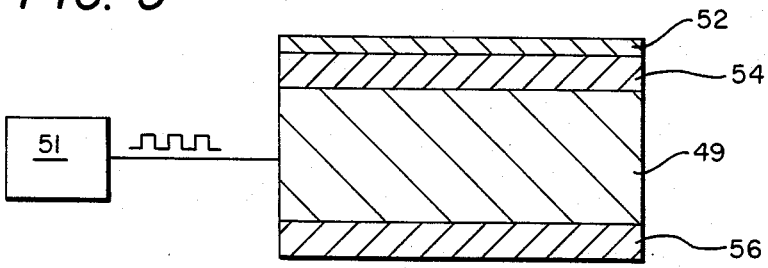
FIG. 5 shows a cross-sectional view of one of the $VO_2$ optical modulators of the present invention.

With reference now to FIG. 5, a cross-sectional view of the VO$_2$ optical modulators 18 and 20 of FIG. 2 is shown. In particular, such modulator comprises a substrate 49 which has a high uniform transmissivity. A suitable substrate material is germanium since it is essentially transparent to infrared energy. VO$_2$ film 52 is deposited on or within a structure of one or more optical matching layers 54 deposited on substrate 49. A number of anti-reflective coating layers 56 can be provided on the opposite sides of the substrate if desired. The relative thickness and optical constants of the optical matching layers is a function of the thickness of the VO$_2$ film and the desired optical reflectance, transmittance and absorptance of the entire structure over the desired spectral band of operation. Where the VO$_2$ film has a thickness in the range of 0.2 to 0.8 micrometers, the corresponding total thickness of either the optical matching layer(s) or the antireflectance coating stack will probably be less than 3 micrometers. The substrate has a thickness on the order of 125 to 1000 micrometers.

In accordance with the present invention, there is shown in FIG. 2 the use of xexon-arc flash lamps 60 and 62 for rapid heating for rebiasing the VO$_2$ thin film on the substrate 49. These arc lamps are energized from a suitable source to provide the necessary thermal rebias in the budgeted time for dynamic operation. From design calculations for flash lamp rebiasing, it has been established that approximately 2.5 joules of absorbed thermal energy are needed to raise the temperature of a typical substrate 10° C.

It should be appreciated that the infrared projector of FIG. 2 utilizes the optical modulators in a "transmittance" mode. In particular, the infrared sources are placed behind the optical modulators 18 and 20 such that the infrared light is transmitted therethrough and modulated by the stored scene data. Since the VO$_2$ modulators also reflect incident infrared light, the infrared projector may be operated in a "reflectance" mode as well, wherein the infrared sources are placed in front of modulators 18 and 20. Further, the black body sources 22 and 24, and the condenser lenses 26 and 28 in each arm of the projector could be replaced by an extended area infrared source. This source must be large enough to fill the field of view of the sensor 16. In either configuration, the source must operate at a temperature higher than that of the highest equivalent black body temperature to be simulated in the scene to compensate for transmission losses in the projector between the source and the test sensor.

A dynamic infrared screen projector for presenting cinematic, two-dimensional, spatially distributed scene data to an infrared test sensor has been described herein. This projector employs programmable, thermoptic infrared modulators that exploit thermally-induced changes in the infrared optical properties of a thin-film of vanadium dioxide (VO$_2$). Because of a hysteresis in the induced effects, a stored scene is created in the modulators by scanning a visible laser beam, modulated by a source of scene data, across the VO$_2$ thin film while it is thermally biased in the hysteresis loop. The scene is projected into a sensor by placing the modulator between an infrared source/condensor system and a system of projection optics. Dynamic scene projection is accomplished by means of an erase-rebias system and optical framing switch to yield a flicker-free output.

Although the invention has been described in detail, it is to be clearly understood that the same is by way of illustration and example only and is not to be taken by way of limitation, the spirit and scope of the invention being limited only to the terms of the appended claims.

I claim:

1. A dynamic infrared scene projector including first and second infrared light sources, first and second condenser optics, and projection optics for projecting cinematic, two-dimensional spatially distributed scene data to an infrared sensor, the improvement comprising:
   first and second optical modulators, each comprising means for exhibiting hysteretic behavior in an optical property as a function of a stimulus for storing frames of the scene data and for modulating incident infrared light, and
   an optical framing switch for controlling the storage of said scene data frames on the first and second optical modulators and the presentation of scene data frames to the sensor.

2. The dynamic infrared scene projector of claim 1 wherein said first and second optical modulators comprise a film of vanadium dioxide deposited on an optical substrate material, said film comprising means for exhibiting substantial changes in transmittance and reflectance of infrared light as a function of temperature for storing said scene data.

3. The dynamic infrared scene projector of claim 1 wherein said framing switch comprises means for creating successive conjugate focal planes in register with respective ones of said optical modulators and in alignment with said projection optics, and wherein said first and second optical modulators include surfaces oriented perpendicularly in said conjugate focal planes of the projection optics created by the presence or absence of the framing switch.

4. The dynamic infrared scene projector of claim 3 wherein said optical framing switch comprises a semicircular annulus oriented at a 45° angle to the surfaces of said optical modulators, said annulus having front and back mirrored surfaces.

5. The infrared scene projector of claim 4 wherein said semicircular annulus comprises means for rotating in and out of a cone of light collected by the projection optics that has been transmitted through said first and second optical modulators for controlling presentation of the scene data frames.

6. The infrared scene projector of claim 4 including a modulated laser beam and wherein said semi-circular annulus comprises means for rotating in and out of the regions scanned by said modulated laser beam to control the recording of scene data for storage alternately on said first and second optical modulators.

7. The dynamic infrared scene projector of claim 1 further including an erase/rebias means for erasing the frames of scene data from the first and second optical modulators and for rebiasing the first and second optical modulators to receive subsequent frames of the scene data.

8. The dynamic infrared scene projector of claim 7 wherein the erase/rebias means includes a pair of nozzles for discharging liquified gas over the first and second optical modulators for erasing the scene data.

9. The dynamic infrared scene projector of claim 8 further including a bandpass filter to define an infrared frequency band to be projected into said sensor.

10. A dynamic infrared scene projector including infrared light source means, condenser optics means, and projection optics for projecting cinamatic two-dimensional, spatially distributed scene data to an infrared sensor, the improvement comprising:
first and second optical modulators, each comprising means exhibiting a hysteretic behavior in an optical property as a function of a stimulus for storing frames of the scene data and for modulating incident infrared light,
an optical framing switch for controlling the storage of said scene data frames on the first and second optical modulators and the presentation of scene data frames to the sensor, and
an erase/rebias means for erasing the frames of scene data from the first and second optical modulators and for rebiasing the first and second optical modulators to receive subsequent frames of the scene data.

11. The dynamic infrared scene projector of claim 10 wherein said first and second optical modulators comprise a film of vanadium dioxide deposited on an optical substrate material, said film comprising means for exhibiting substantial changes in transmittance and reflectance of infrared light as a function of temperature for storing said scene data.

12. The dynamic infrared scene projector claim 10 wherein said framing switch comprises means for creating successive conjugate focal planes in register with respective ones of said optical modulators and in alignment with said projection optics and wherein said first and second optical modulators includes surfaces oriented perpendicularly to define a plane axis in said conjugate focal planes of the projection optics created by the presence or absence of said framing switch.

13. The dynamic infrared scene projector of claim 12 wherein said optical framing switch comprises a semicircular annulus oriented at a 45° angle to the surfaces of said optical modulators, said annulus having front and back mirrored surfaces.

14. The infrared scene projector of claim 13 wherein said semicircular annulus comprises means for rotating in and out of a cone of light collected by the projection optics that has transmitted through said first and second optical modulators for controlling presentation of the scene data frames.

15. The infrared scene projector of claim 14 including a modulated laser beam and wherein said semi-circular annulus comprises means for rotating in and out of the regions scanned by said modulated laser beam to control the recording of scene data for storage alternately on said first and second optical modulators.

16. The dynamic infrared scene projector of claim 10 further including a bandpass filter to define an infrared frequency band to be projected into said sensor.

17. A method for projecting prerecorded cinematic, two-dimensional, spatially distributed scene data from a dynamic infrared scene projector to an infrared sensor, comprising the steps of:
modulating an infrared light beam as a function of the prerecorded scene data;
scanning the beam in a two-dimensional pattern to record (write) the scene data for storage in a frame-by-frame manner on first and second optical modulators capable of modulating incident infrared light; and
projecting the stored scene data frames from the first and second optical modulators in an alternating manner to produce a flicker-free image presented to the sensor.

18. The method of claim 17 further including the step of erasing the frame of scene data on the first optical modulator while the frame of scene data on the second optical modulator is being projected into the sensor.

19. The method of claim 18 wherein the erasure of the scene data is accomplished by lowering the temperature of the first optical modulator below a predetermined temperature.

20. The method of claim 18 further including the step of rebiasing the first optical modulator while the frame of scene data on the second optical modulator is being projected into the sensor.

21. The method of claim 20 wherein the rebiasing of the first optical modulator is accomplished by raising the temperature of the first optical modulator to a predetermined bias temperature.

22. The method of claim 21 further including the step of writing a new frame of scene data into the first optical modulator while the frame of scene data on the second optical modulator is being projected into the sensor.

23. The method of claim 22 wherein the writing of said new frame of scene data is accomplished by varying the intensity of the scanned beam across the surface of the first optical modulator to produce stored spots of varying contrast.

24. The method of claim 22 wherein the new frame of scene data on the first optical modulator is projected onto the sensor while the frame of scene data on the second optical modulator is erased.

25. The method of claim 24 wherein the second optical modulator is rebiased and a new frame of scene data is recorded (written) thereon while the frame of scene data on the first optical modulator is being projected into the sensor.

26. The method of claim 17 wherein the stored scene data is projected into the sensor by projecting with optical components infrared radiation (light) that has been transmitted through the first and second optical modulators.

* * * * *